(12) United States Patent
Kurata et al.

(10) Patent No.: US 8,020,660 B2
(45) Date of Patent: Sep. 20, 2011

(54) PUMP DEVICE

(75) Inventors: Masakazu Kurata, Yokohama (JP);
Takumi Hisazumi, Kanagawa (JP);
Yasuhito Nakakuki, Kanagawa (JP);
Mitsuaki Nakada, Kanagawa (JP)

(73) Assignee: Hitachi, Ltd., Tokyo (JP)

( * ) Notice: Subject to any disclaimer, the term of this patent is extended or adjusted under 35 U.S.C. 154(b) by 1047 days.

(21) Appl. No.: 11/453,969

(22) Filed: Jun. 16, 2006

(65) Prior Publication Data

US 2007/0062183 A1 Mar. 22, 2007

(30) Foreign Application Priority Data

Aug. 25, 2005 (JP) .................. 2005-243644

(51) Int. Cl.
*F16D 31/00* (2006.01)
(52) U.S. Cl. ........ 180/417; 180/419; 180/421; 180/422; 60/476
(58) Field of Classification Search .................. 180/417, 180/419, 421, 422, 423; 60/476
See application file for complete search history.

(56) References Cited

U.S. PATENT DOCUMENTS

| 7,174,988 | B2 | 2/2007 | Sasaki et al. | |
|---|---|---|---|---|
| 2002/0170769 | A1* | 11/2002 | Sakaki et al. | 180/441 |
| 2004/0195038 | A1* | 10/2004 | Ikeda et al. | 180/421 |
| 2005/0023073 | A1* | 2/2005 | Sasaki et al. | 180/422 |

FOREIGN PATENT DOCUMENTS

| JP | 2003-154954 A | 5/2003 |
|---|---|---|
| JP | 2004-276664 A | 10/2004 |
| JP | 2004-306721 A | 11/2004 |
| JP | 2005-47296 | 2/2005 |

* cited by examiner

*Primary Examiner* — Tony H. Winner
*Assistant Examiner* — Jacob Knutson
(74) *Attorney, Agent, or Firm* — Antonelli, Terry, Stout & Kraus, LLP.

(57) ABSTRACT

In a pump device applicable to a power steering apparatus, a pump element is housed within a pump housing and is configured to drain a working oil, an electric motor is configured to drive the pump element, a reservoir tank is installed on the housing and is configured to reserve the working oil supplied to the oil element, a passage is formed within the pump housing and is connected to the pump element, and a control valve is installed in the pump housing, is configured to communicate with the passage, and is configured to control a flow of the working oil caused to flow through the passage.

21 Claims, 7 Drawing Sheets

PUMP DEVICE

BACKGROUND OF THE INVENTION (a) Field of the Invention

The present invention relates to a pump device, for example, used in a power steering apparatus which provides a steering force or a steering assistance force for a steering mechanism of an automotive vehicle by an operation of a hydraulic (or hydraulic pressure) power cylinder in accordance with a steering torque outputted from the steering mechanism of the automotive vehicle.

(b) Description of the Related Art

A previously proposed pump device is exemplified by a Japanese Patent Application First Publication (tokkai) No. 2004-276664 published on Oct. 7, 2004 in which the previously proposed pump device is applied to a power steering apparatus. The disclosed power steering apparatus includes: a steering shaft attached onto a steering wheel; an output shaft connected with a lower end of the steering shaft; a rack-and-pinion mechanism installed on a lower end of the output shaft; a hydraulic (pressure) power cylinder interlinked with a rack of the rack-and-pinion mechanism; a reversible pump which relatively supplies a working oil to first and second hydraulic pressure chambers located at left and right sides of the hydraulic pressure power cylinder via first and second passages; and a control valve which is a return check valve installed in a bypass passage connected between the first and second passages.

This control valve is configured to have a working oil which is drained from a reversible pump supplied to the hydraulic pressure power cylinder in response to a closure of a pressure application side (or pressurization side) valve and, while, have the working oil within the hydraulic power cylinder exhausted to a reservoir tank in response to an open of a non-pressure application side (non-pressurization side) valve. This exhaust action causes an efficient reduction in the hydraulic pressure at the non-pressure application side (non-pressurization side) and causes such contaminations and air as metallic powders present in piping to be exhausted within the reservoir tank.

Then, if, during a vehicular run, an ordinary leftward (counterclockwise) or rightward (clockwise steering through the steering wheel is carried out, a detection mechanism detecting this steering torque according to the steering operation causes the reversible pump to normally or reversely revolve via an electronic controller so that the working oil in either one of the first and second hydraulic pressure chambers and within either one of the first and second communication passages is selectively supplied to the other of the first and second hydraulic pressure chambers and within the other of the first and second communication passages.

SUMMARY OF THE INVENTION

However, in the power steering apparatus described above, the previously proposed pump device includes, for example, a trochoid oil pump and an electric motor driving the oil pump, the oil pump being integrally installed with the reservoir tank which reserves the working oil of the oil pump. In this way, in the power steering apparatus described above, in a case where the control valve which performs a flow passage change and a flow quantity control of the working oil passing through the pump device and the working oil within the piping passage connected to the pump device is connected to the piping passage, a connection passage to connect between the control valve and the piping passage is additionally (or separately) needed.

Consequently, a piping structure in the power steering apparatus becomes complex and may become difficult in controlling or managing the piping structure. In addition, a leakage countermeasure of the working oil from the above-described piping passage becomes difficult to be achieved.

It is, therefore, an object of the present invention to provide an improved pump device applicable to a power steering apparatus which can solve the above-described inconveniences, namely, the piping structure in the power steering apparatus can become simple and cannot be difficult in controlling or managing the piping structure and the leakage countermeasure described above cannot become difficult to be achieved.

To achieve the above-described object, according to one aspect of the present invention, there is provided a pump device comprising: a pump element housed within a pump housing and configured to drain a working oil; an electric motor configured to drive the pump element; a reservoir tank installed on the pump housing and configured to reserve the working oil supplied to the pump element; a passage formed within the pump housing and connected to the pump element; and a control valve installed in the pump housing, communicated with the passage, and configured to control a flow of the working oil caused to flow through the passage.

To achieve the above-described object, according to another aspect of the present invention, there is provided a pump device comprising: a pump element housed within a pump housing and configured to drain a working oil; an electric motor configured to drive the pump element; a reservoir tank installed on the pump housing and configured to reserve the working oil supplied to the oil element; a pair of passages formed within the pump housing and connected to the pump element; and a control valve installed in the pump housing and configured to control a flow of the working oil caused to flow through the pair of passages.

To achieve the above-described object, according to a still another aspect of the present invention, there is provided a pump device applicable power steering apparatus, comprising: a hydraulic power cylinder configured to assist a steering force for a steering mechanism connected to steering road wheels and including a first hydraulic chamber and a second hydraulic chamber; a first passage connected to the first hydraulic chamber; a second passage connected to the second hydraulic chamber; a reversible pump in which a pump unit is installed within a pump housing and is configured to selectively supply a drain pressure to a pair of drain ports that communicate the first passage and the second passage according to normal and reverse revolutions of a driving shaft thereof, the reversible pump being configured to selectively supply a hydraulic pressure to the hydraulic power cylinder; a motor connected to the driving shaft of the reversible pump and configured to normally and reversely revolve the reversible pump; a steering load detecting section configured to detect or estimate a steering load of a steering wheel configured to perform a turning control for the steering road wheels; a motor control section configured to output a drive signal to the motor to develop a desired hydraulic on the basis of the steering load; a first bypass valve installed between the first passage and a reservoir tank, configured to interrupt a communication between the first passage and the reservoir tank when the first passage indicates a pressurization state, and configured to communicate the first passage with the reservoir tank when at least the second passage is in the pressurization state; and a second bypass valve installed between the second passage and the reservoir tank, configured to interrupt the communication between the second passage and the reservoir tank when the second passage is in the pressurization state, and configured to communicate the second passage with the reservoir tank when at least the first passage is in the pressurization state, the first bypass valve and the second bypass valve being disposed within the pump housing or a valve housing integrally installed with the pump housing.

To achieve the above-described object, according to a further another aspect of the present invention, there is provided a pump device applicable power steering apparatus, comprising: a hydraulic power cylinder configured to assist a steering force for a steering mechanism connected to steering road wheels and including a first hydraulic chamber and a second hydraulic chamber; a first passage connected to the first hydraulic chamber; a second passage connected to the second hydraulic chamber; a pump unit configured to selectively supply a drain pressure to the first and second passages; a housing in an inside of which the pump unit is housed; an electric motor connected to the housing and configured to normally and reversely rotate the pump unit; a reservoir tank connected to the housing and configured to reserve the working oil therein; a first bypass valve installed in the housing, configured to interrupt the communication between the first passage and the reservoir tank during a pressurization state of the first passage, and configured to communicate the first passage and the reservoir tank when at least the second passage is in the pressurization state; a first exhaust path installed on the housing and configured to connect the first bypass valve and the reservoir tank; a second bypass valve disposed within the housing, configured to interrupt the communication between the second passage and the reservoir tank when the second passage is in the pressurization state, and configured to communicate the second passage and the reservoir tank when at least the first passage is in the pressurization state; and a second exhaust path disposed in the housing and configured to connect the second bypass valve to the reservoir tank.

This summary of the invention does not necessarily describe all necessary features so that the present invention may also be a sub-combination of these described features. Other objects and advantages will be apparent from the ensuring specification and drawings.

DETAILED DESCRIPTION OF THE INVENTION

Reference will hereinafter be made to the drawings in order to facilitate a better understanding of the present invention.

Figure 1:
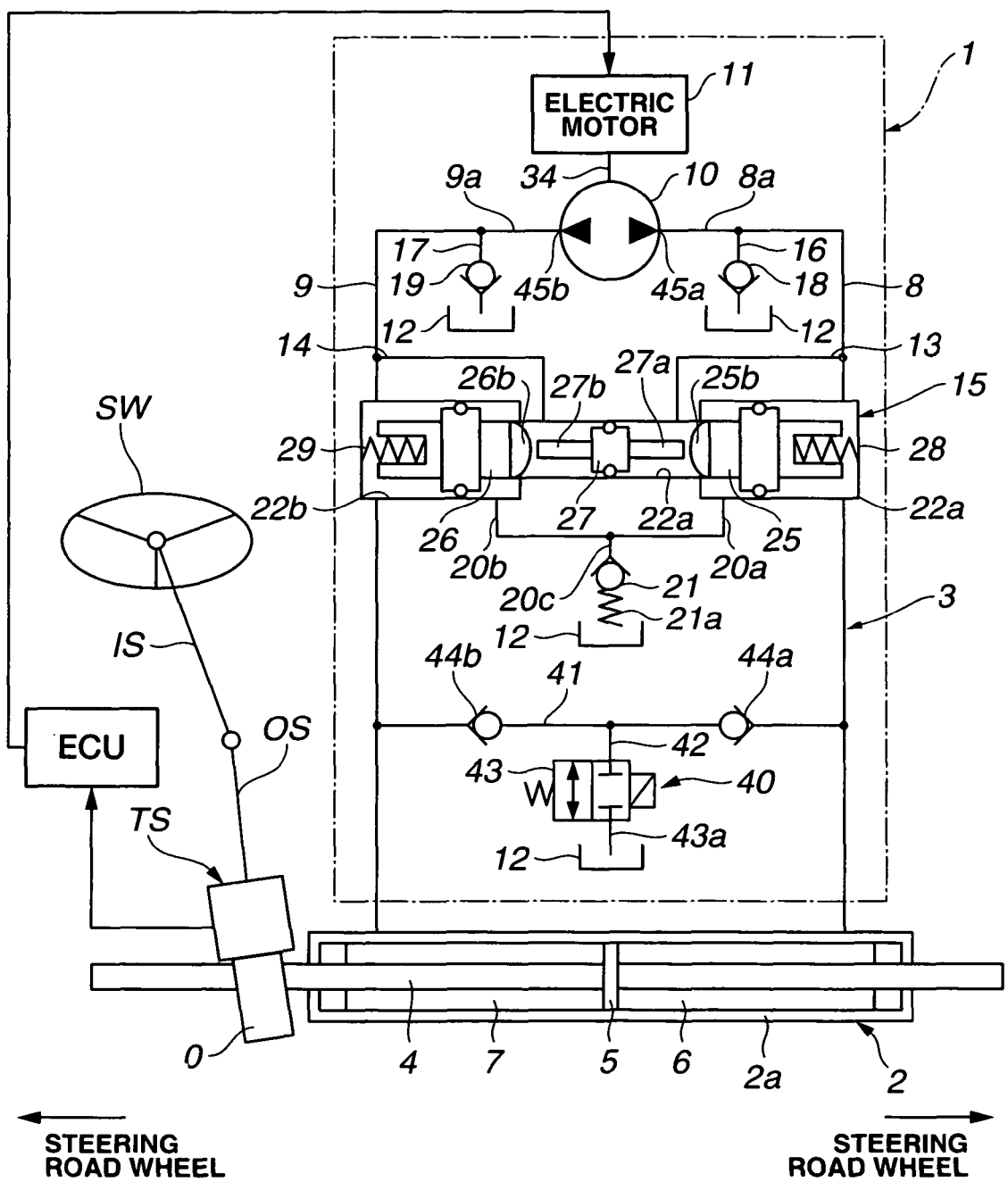
FIG. 1 is a rough configuration view of a power steering apparatus to which a first preferred embodiment according to the present invention is applicable.

FIG. 1 shows a schematic whole hydraulic circuit configuration view of a power steering apparatus to which a first preferred embodiment of a pump device according to the present invention is applicable. FIGS. 2 through 6 show a state in which an oil pump, main passages, and so forth are, specifically, housed in a pump housing 1.

In details, a rough configuration of the power steering apparatus will be described below on the basis of FIG. 1. The power steering apparatus includes: a steering wheel SW which is steering input means (a steering input section); a rack-and-pinion mechanism O installed on an output shaft OS installed at a lower end of a steering shaft IS connected with steering wheel SW; a steering load detecting section (steering load detecting means) TS that detects a steering rotational torque of steering wheel SW and a road surface input from front left and right road wheels (for example, corresponds to steering road wheels); a hydraulic (pressure) power cylinder 2 connected to the rack; and a hydraulic circuit 3 in which the main passages are formed in an inside of pump housing 1 and which serves to supply and exhaust a working hydraulic pressure to and from hydraulic pressure power cylinder 2.

A piston rod 4 connected to the rack of rack-and-pinion mechanism O is penetrated through a cylindrically shaped cylinder portion 2a of hydraulic power cylinder 2 extended in a vehicle body width direction. A piston 5 is fixed to piston rod 4 and is configured to slidably move (slide) within cylindrically shaped cylinder portion 2a. In addition, piston 5 serves to partition cylindrically shaped cylinder portion 2a into left-side first hydraulic pressure chamber 6 and right-side second hydraulic pressure chamber 7.

Pump housing 1, as typically shown in FIGS. 2 through 5, (mainly) includes: a pump body 1a; a plate member 1b, both for housing oil pump 1 and so on jointly in the inside of pump housing 1 and a cylindrical supporting member 1c arranged on an outer periphery of plate member 1b for supporting a reservoir tank 12 on an outer periphery of plate member 1b.

Hydraulic circuit 3, as typically shown in FIGS. 2 through 6, includes: a pair of first and second passages 8, 9 whose respective one ends are connected to respective hydraulic pressure chambers 6 and 7; a reversible oil pump 10 which is a pump element and which serves to selectively supply and exhaust the hydraulic pressure to and from both of first and second passages 8 and 9; first and second exhaust passages 13, 14 connected to midway positions through first and second passages 8, 9, respectively, and whose respective downstream ends are communicated with reservoir tank 12; and a control valve 15 which relatively opens and closes respective first and second exhaust passages 13, 14 according to a pressure difference within respective first and second passage 8, 9 to relatively open and close respective first and second exhaust passages 13, 14 to relatively switch communications with reservoir tank 12.

Compensation passages 16, 17 are installed at upstream sides of first and second passages 8, 9. First and second check valves 18, 19 which are one-directional valves to allow flowing in of the working oil only in a direction in which the working oil is sucked from reservoir tank 12 are installed in respective compensation passages 16, 17. First and second passages 8, 9 are formed on the same plane within pump housing 1, as typically shown in FIGS. 1, 5, and 6, and respective other ends thereof are connected to a pair of drain ports (although called, a pair of discharge openings, but, hereinafter, called the pair of drain ports) (suction ports) 45a, 45b of oil pump 10, as typically shown in FIG. 1, FIG. 5, and FIG. 6.

Figure 3:
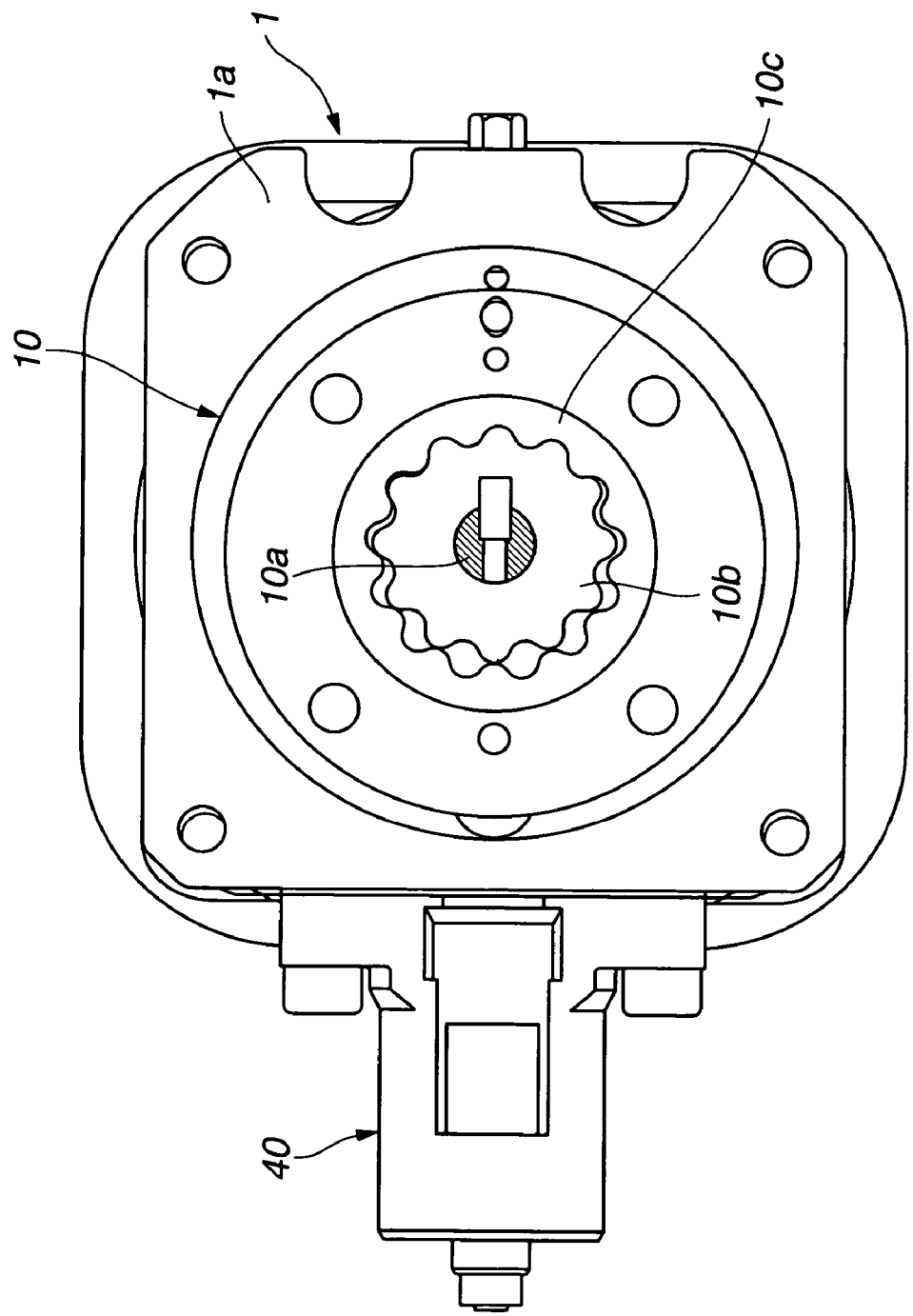
FIG. 3 is a cross sectioned view cut away along a line of A-A shown in FIG. 2.
Figure 4:
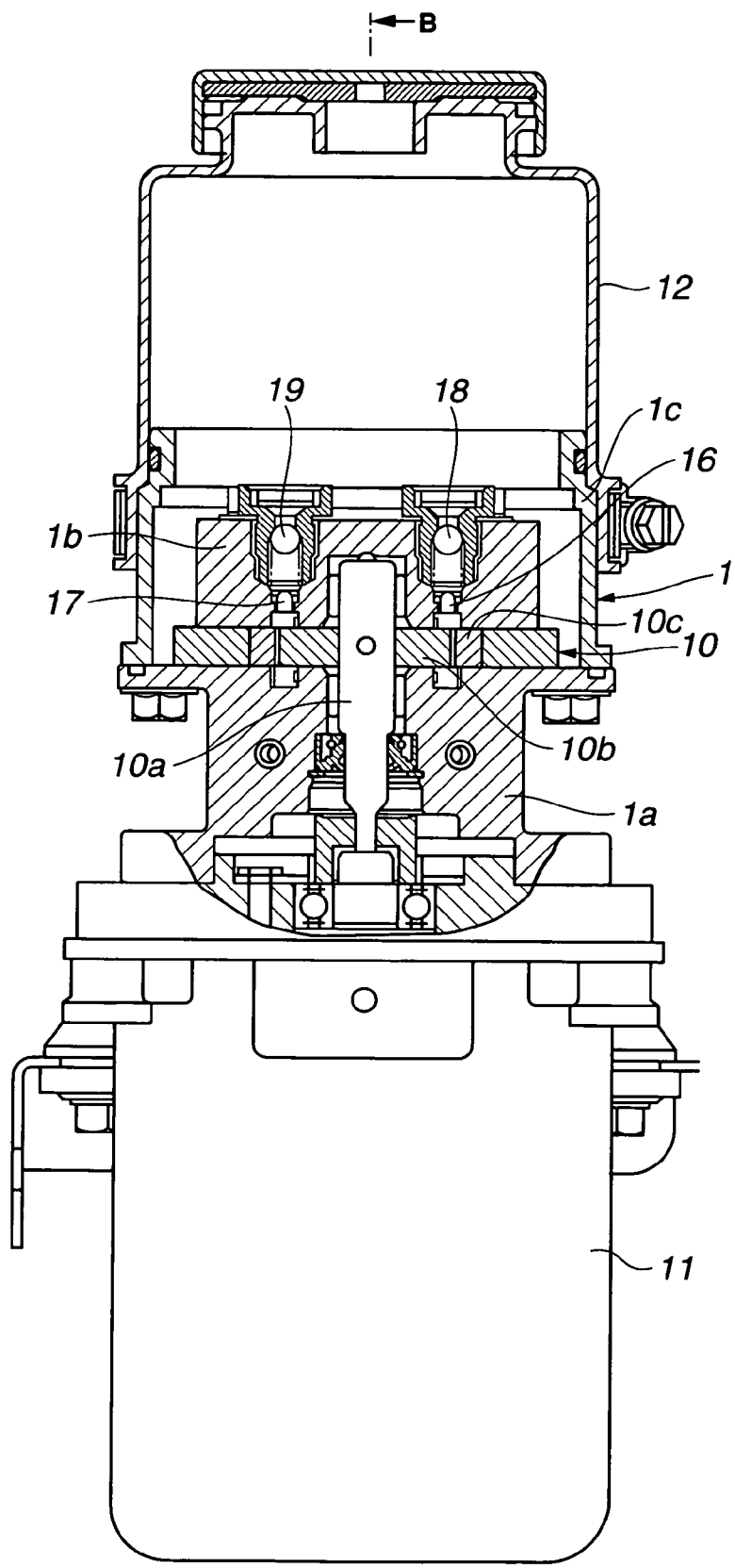
FIG. 4 is a cross sectioned view cut away along a line of B-B shown in FIG. 2.

Oil pump 10 is, as typically shown in FIG. 3, constituted by a general trochoid type pump including an inner rotor 10b coupled to driving shaft 10a and an outer rotor 10c meshed with outer peripheral teeth of inner rotor 10b, driving shaft 10a being enabled to be rotated in normal and reverse directions by an electric motor 11.

Electric motor 11 serves to revolve and stop oil pump 10 and to revolve oil pump 10 in normal and reverse directions according to a control current from an electronic controller (ECU) which is a motor control section (motor control means) on the basis of a detection signal outputted from steering load detecting section (means) TS.

Connection portions of both of first and second exhaust passages 13, 14 at their respective downstream ends are connected to first and second exhaust paths 20a, 20b to which reservoir tank 12 is communicated. A check valve 21 which is the one-directional valve configured to allow the flowing in of the working oil from respective passages 8, 9 only in the direction toward reservoir tank 12 is disposed in an exhaust hole 20c to which respective first and second exhaust paths 20a, 20b are collected. Respective first and second exhaust paths 20a, 20b, exhaust hole 20c, and check valve 21 are disposed at an upper position in a gravity direction than respective poppet valve bodies 25, 26 of control valve 15.

A coil spring 21a which biases exhaust hole 20c in a closure direction by means of a ball valve body is disposed in check valve 21.

Figure 5:
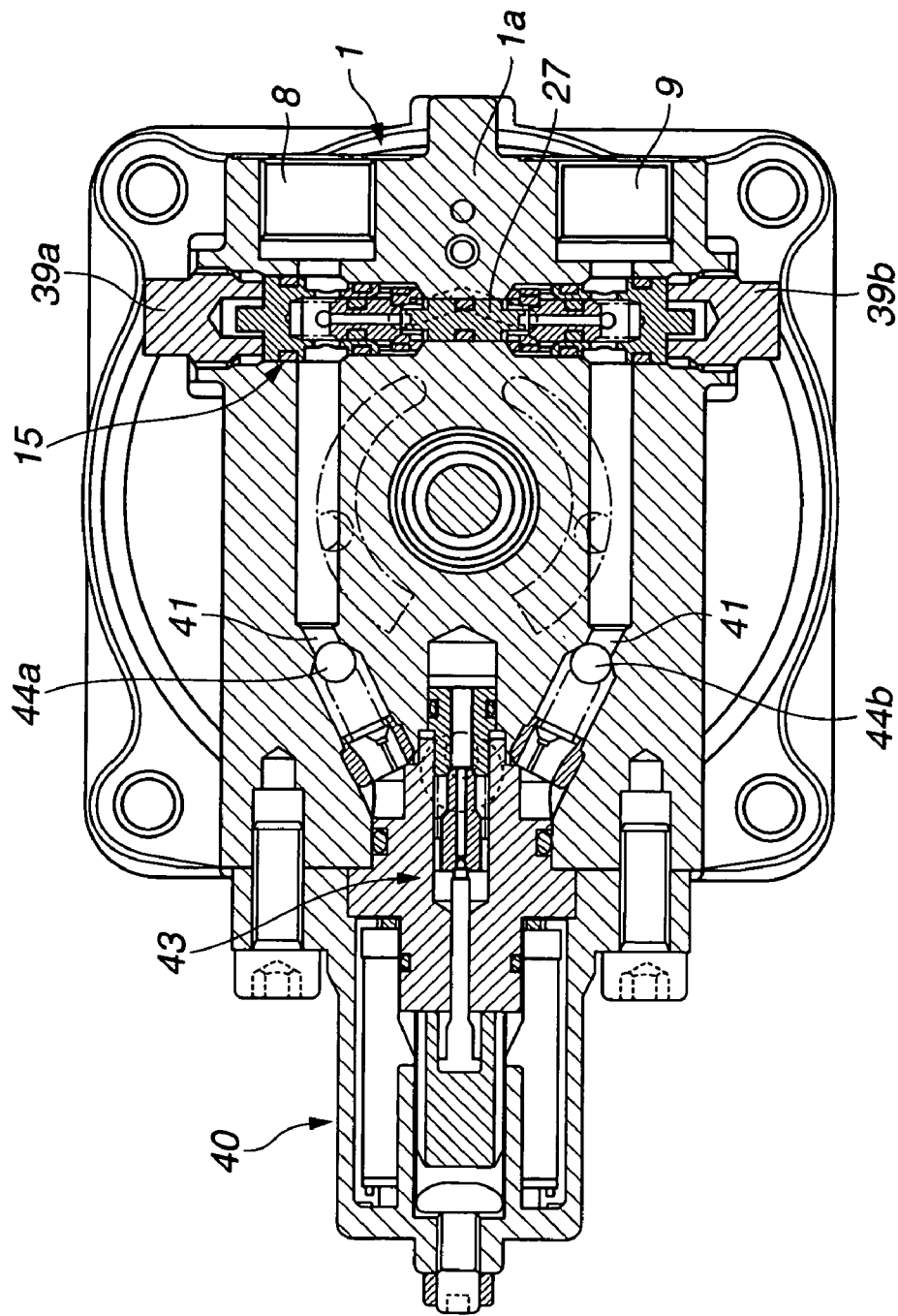
FIG. 5 is a cross sectioned view cut away a line of C-C shown in FIG. 2.
Figure 6:
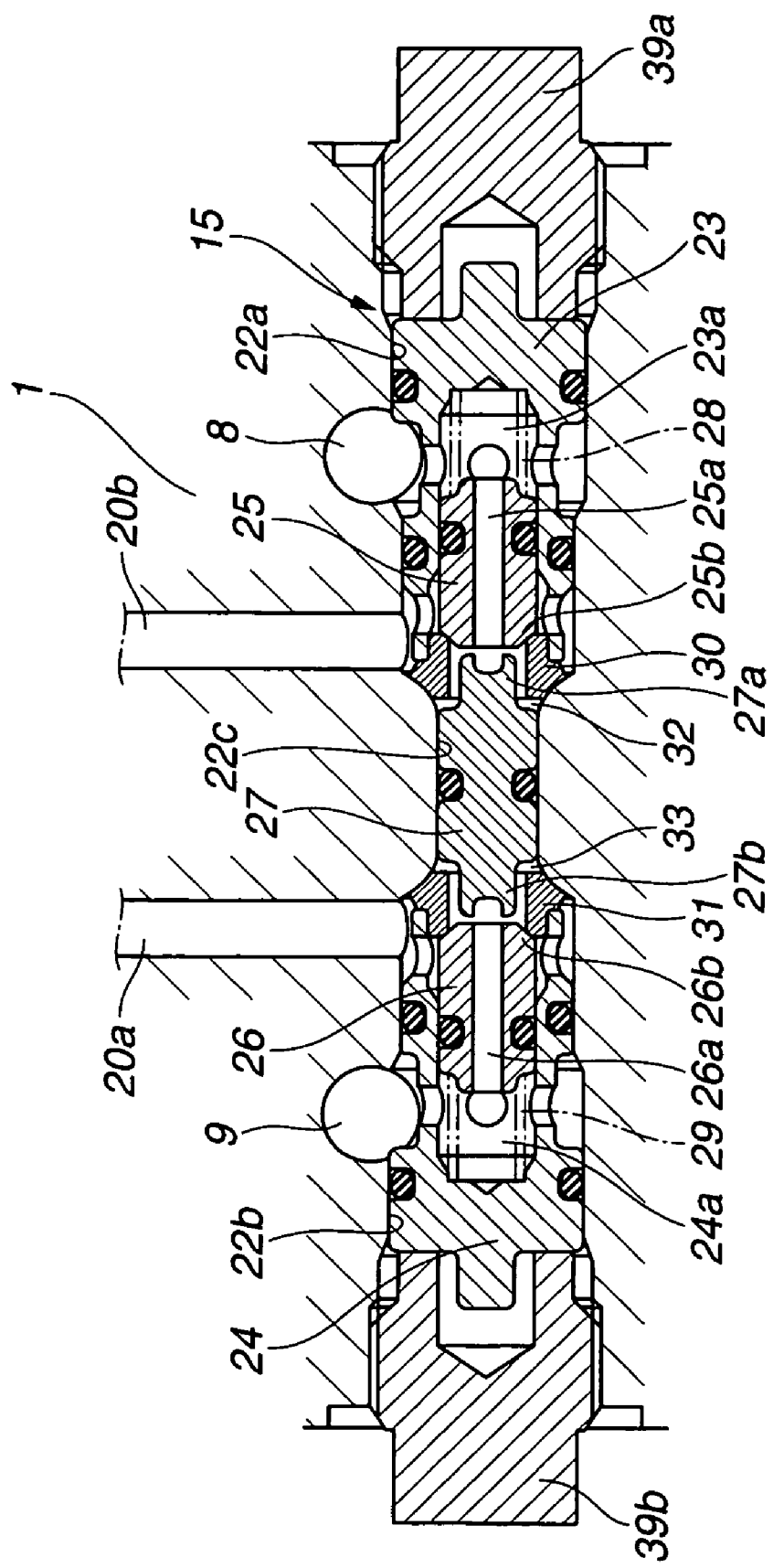
FIG. 6 is a cross sectional view of a control valve applicable to the first embodiment shown in FIGS. 1 through 5.

Control valve 15 is housed within an internal portion (inside) of pump body 1a, formed in a straight line (or in-line) form (or in a row form), crossing respective midways of first and second passages 8, 9, and is disposed approximately in parallel to a (virtual) straight line connecting respective connection portions 8a, 9a to connect oil pump 10 with first and second passages 8, 9, as typically shown in FIGS. 1, 5, and/or 6, Furthermore, control valve 15 is disposed so that part of control valve 15 is overlapped on the pair of first and second passages 8, 9 in axial directions of first and second passages 8, 9, as typically shown in FIG. 6.

Control valve 15 includes: first and second valve holes 22a, 22b which are pair of valve housing holes with which respective first and second exhaust passages 13, 14 are communicated at a center portion therebetween to which first and second valve holes 22a, 22b are mutually communicated; bell shaped cylindrical valve bodies 23, 24 respectively fixed to insides of first and second valve holes 22a, 22b; first and second poppet valve bodies 25, 26 which are pair of bypass valves to relatively open and close respective first and second exhaust passages 13, 14 on the basis of a pressure difference between first and second passages 8, 9; and a free piston 27 which is a piston member disposed within a slide hole 22c which is communicated between both valve holes 22a, 22b at a center of the control valve 15 to be slidably disposed in directions of respective poppet valve bodies, namely, in the axial direction of control valve 15 to control relative operation positions of respective poppet valve bodies 25, 26. It is noted that each valve hole 22a, 22b has an outer end opening closed by each plug body 39a, 39b.

Respective first and second poppet valve bodies 25, 26 are arranged in straight line (row) forms within respectively corresponding valve bodies 23, 24 and are formed in cylindrical shapes and in step difference forms. In the internal axis direction, first and second pressure introducing holes 25a, 26a are penetrated in their internal axis directions of respective poppet valve bodies 25, 26 to cause a working hydraulic pressure of the pair of first and second passages 8, 9 to flow from back pressure chambers 23a, 24a. In addition, outer peripheral surfaces of mutually opposing tip portions of respective poppet valve bodies 25, 26 are enabled to be separated from or to be seated on respective seat surfaces of first and second valve seats 30, 31 fixed onto opposing tip portions of respective valve bodies 23, 24. In addition, mutually opposing opening ends of respective pressure introducing holes 25a, 26a which face against center projections 27a, 27b of free piston 27 are faced against tip recess portions of center projections 27a, 27b.

Furthermore, respective poppet valve bodies 25, 26 are biased in a direction toward free piston 27 by means of spring forces of first and second coil springs 28, 29 which are biasing members (elastically) interposed between rear end portions of respective first and second poppet valve bodies 25, 26 and bottom surfaces of valve bodies 23, 24. Thus, during non-operation of oil pump 10, respective poppet valve bodies 25, 26 are held at neutral positions. In this state, respective valve portions 25b, 26b are seated on seat surfaces of first and second valve seats 30, 31. Thus, control valve is, so-called, of a normally (always) closure type in which communications between respective first and second exhaust passages 13, 14 and exhaust paths 20a, 20b are interrupted.

Free piston 27 is slid (slidably moved) in a leftward or rightward direction as viewed from FIG. 6 according to the pressure difference between respective first and second passages 8, 9, namely, according to the pressure difference between respective first and second pressure (receiving) chambers (or first and second pressure receiving surfaces) 32, 33 to which the hydraulic pressure is introduced from respective first and second passages 8, 9 via respective first and second exhaust passages 13, 14. Thus, free piston 27 causes one of respective poppet valve bodies 25, 26 to be relatively switched and slid in the leftward or rightward (forward-or-rearward) direction against the spring force of a corresponding one of coil springs 28, 29.

It is noted that a suction passage 34 of oil pump 10 is communicated with reservoir tank 12.

It is also noted that a fail-safe mechanism (in a narrow sense of term, fail-safe valve) 40 is disposed between parts of first and second passages 8, 9 which are located between control valve 15 and hydraulic power cylinder 2.

Figure 2:
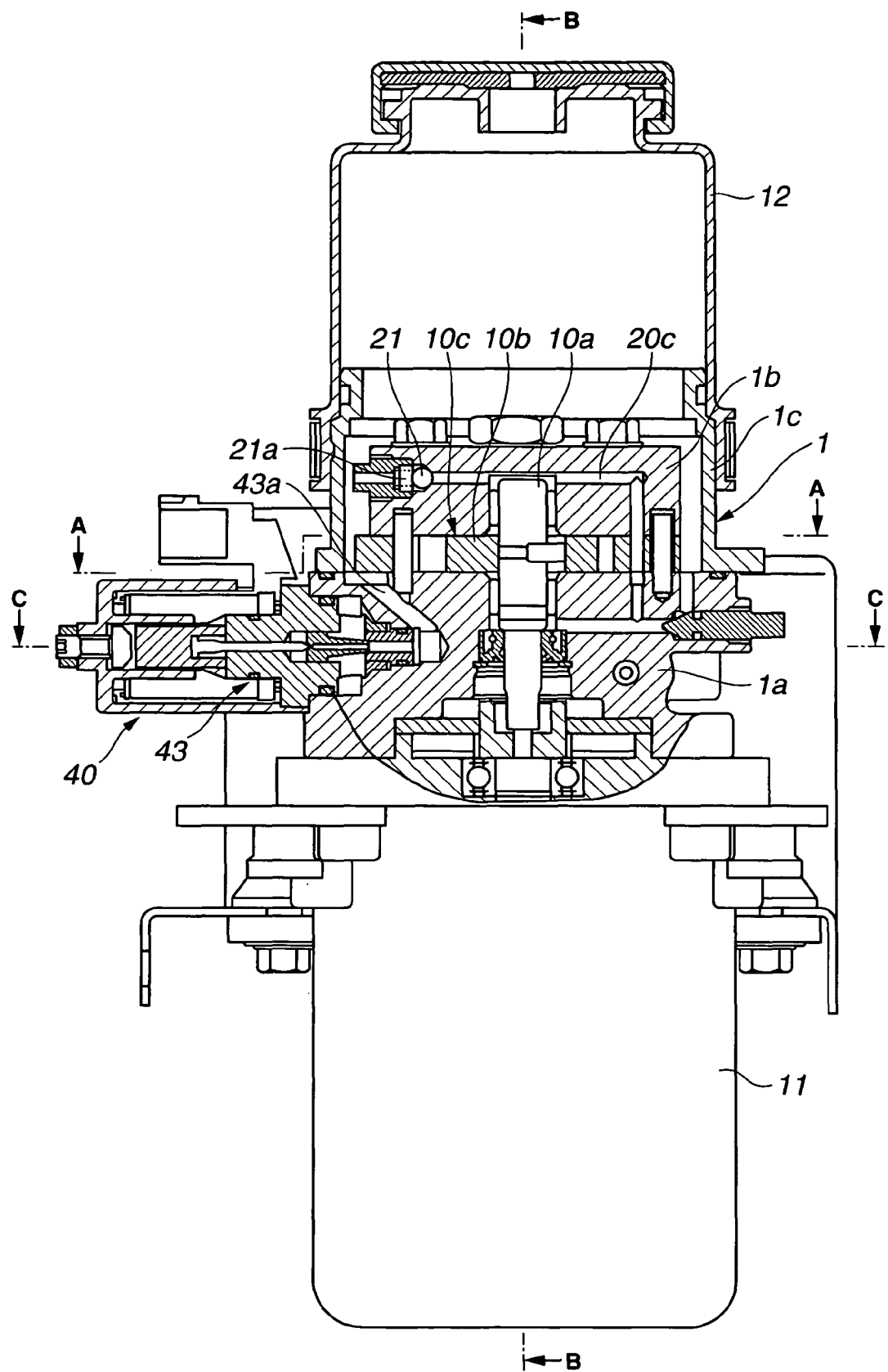
FIG. 2 is a longitudinal cross sectional view of the power steering apparatus to which an inside of a housing and a reservoir tank used in the first embodiment shown in FIG. 1.

Fail-safe mechanism 40 is, as typically shown in FIGS. 1, 2, and/or 5, formed on an internal portion (inside) of pump body 1a and includes: a communication passage 41 which is a connection passage to communicate between first and second passages 8, 9; a switching valve 43 installed at an approximately center position of communication passage 41 via a passage hole 42; and first and second check valves 44a, 44b disposed in both ends of communication passage 42 to allow flowing of the working oil only in a direction from each of first and second passages 8, 9 to passage hole 42.

Switching valve 43 is of an electromagnetic valve of a two-direction-and-two-position type electromagnetic valve. Part of switching valve 43 is housed in the internal portion of pump body 1a. Switching valve 43 is disposed approximately in parallel to the axial direction of oil pump 10. A drain passage 43a connected to switching valve 43 is communicated with reservoir tank 12. An output signal from electronic controller ECU causes an interruption of communication passage 41 during a normal operation of the power steering apparatus and causes a communication of communication passage 41 so that the working oil within respective hydraulic chambers 6, 7 are enabled to be replaced and to be caused to flow.

Hereinafter, an action of the embodiment described above will be described below. First, suppose that, during a straight run of an automotive vehicle in which the steering apparatus described above is mounted, a vehicle driver does not operate steering wheel SW so that a neutral state is maintained, the control current is outputted from electronic controller ECU to electric motor 11, and, hence, oil pump 10 is in a non-operation state.

In the above-described case, as typically shown in FIGS. 1 and 6, the pressure difference between respective first and second passages 8, 9 is not developed. Hence, respective first and second poppet valve bodies 25, 26 maintain neutral positions thereof via free piston 27 by means of the spring forces of respective coil springs 28, 29. Then, respective valve portions 25b, 26b of first and second poppet valve bodies 25, 26 seat on respective seat surfaces so that the communications between respective exhaust passages 13, 14 and respective exhaust paths 20a, 20b are interrupted.

Thereafter, suppose that a vehicle driver operates steering wheel SW, for example, in a clockwise (rightward) direction (as viewed from the vehicle driver). In this case, oil pump 10 is, for example, driven in the normal direction via electric motor 11 in response to the control current from electronic controller (ECU) on the basis of the detection signal of steering load detecting section (means) TS. The above-described pump action causes the working oil in second passage 9 to be sucked and drained into first passage 8. A major part of the working oil within first passage 8 is caused to flow into first hydraulic chamber 6 via first back pressure chamber 23a and part of the working oil within first passage 8 is caused to flow into first pressure receiving chamber 32 via first exhaust passage 13. At the same time, the working oil within reservoir tank 12 is caused to flow into first passage 8 and first hydraulic chamber 6 via oil pump 10 so as to compensate for an insufficient quantity of working oil.

Therefore, since first pressure receiving chamber 32 indicates a high pressure and second pressure receiving chamber 33 indicates a low pressure, free piston 27 is slid in the direction toward second poppet valve body 26 direction (leftward direction) to retract second poppet valve body 26 in the direction of back pressure chamber 24a against the spring force of coil spring 29 and is separated at a longer distance from first poppet valve body 25.

Hence, first exhaust passage 13 maintains the closed state. On the other hand, second pressure receiving chamber side of second exhaust passage 14 is opened and part of working oil within second passage 9 is speedily exhausted into reservoir tank 12 via check valve 21. Therefore, a pressure reduction speed at second passage side 9 becomes fast and a development of a residual (remaining) pressure is prevented.

On the other hand, suppose that steering wheel SW is returned to its original state from the clockwise directional steering operation described above and, furthermore, a counterclockwise (leftward) steering operation through steering wheel SW is carried out. In this case, oil pump 10 is reversed via electric motor 11 by means of electronic controller (ECU).

Hence, in turn, on the contrary as described above, the working oil in first passage 8 and the working oil within (second) reservoir tank 12 (placed below check valve 19) are drained into second passage 9 and supplied into second hydraulic chamber 7 via second back pressure chamber 24a.

Hence, an inner pressure of first pressure receiving chamber 32 is reduced and the inner pressure of second pressure receiving chamber 33 becomes higher. Thus, free piston 27 is slid into the rightward direction to retract first poppet valve body 25 toward first back pressure chamber 23a against the spring force of coil spring 28 and is separated with the longer distance from second poppet valve body 26.

Thus, although second exhaust passage 14 is closed, first pressure receiving side 32 of first exhaust passage 13 is opened so that part of the working oil within first passage 8 is speedily exhausted into reservoir tank 12 via check valve 21. Hence, a pressure reduction speed at first passage side 8 becomes fast. Then, the development of the residual pressure is prevented in the same way as described above.

As described above, since the inner pressure of one of first and second passages 8, 9 which indicates the low pressure can speedily be reduced during the rightward (clockwise) or leftward (counterclockwise) steering operation of steering wheel SW, the steering assistance of steering wheel SW is speedily carried out. A development of an abrupt torque variation on steering wheel SW is prevented and a favorable steering feeling can be obtained.

Operations of respective first and second poppet valve bodies 25, 26 are controlled according to the pressure difference between respective first and second pressure receiving chambers 32, 33 (pressure difference between first and second passages 8, 9). Therefore, as compared with a case where an electrical device (means) such as an electromagnetic valve is used, a simplification of the control can be achieved. In addition, a manufacturing of the apparatus product becomes easy and a rise in cost of the manufacturing thereof can be suppressed, due to a mechanically simple structure.

In this embodiment, control valve 15 is disposed within pump housing 1. As compared with a case in which control valve 15 is disposed within another separated body different from pump housing 1, control valve 15 can easily be communicated with first and second passages 8, 9. Thus, the control (management) of the piping of these control valve and first and second passages 8,9 can become simple.

In addition, control valve 15 is disposed approximately in parallel to the straight line connecting between connection portions 8a, 9a. Thus, distances on first and second passages 8, 9 from connection portions 8a, 9a to control valve 15 can mutually approximately be equal to each other. Hence, it becomes possible to make hydraulic pressure characteristics of the working oil caused to flow through respective first and second passages 8, 9 uniform.

Part of control valve 15 is overlapped on first and second passages 8, 9 in the axial direction thereof. Hence, it is not necessary to especially dispose a passage to communicate pair of (first and second) passages 8, 9 with control valve 15. In this respect, the simplification of the whole piping structure and a reduction of the manufacturing cost can be achieved.

Furthermore, communication passage 41 and switching valve 43 are installed within the internal of pump housing 1 not external to pump housing 1. Hence, it is not necessary to use specially a pipe to constitute communication passage 15 and it is not necessary to dispose a pipe to connect communication passage 41 and switching valve 43. Hence, the whole piping structure can be simplified and a compact of the whole apparatus can achieved.

Switching valve 43 is disposed approximately in parallel to the axial direction of oil pump 10. Hence, as compared with a case where switching valve 43 is disposed in a radial direction of oil pump 10, a magnitude in the radial direction of the whole apparatus can be made smaller.

In addition, in this embodiment, respective first and second poppet valve bodies 25, 26 are installed within pump housing 1. Thus, distances between respective first and second poppet valve bodies 25, 26 and the pair of draining outlets of oil pump 10 within pump housing 1 can be minimized. Hence, speedily exhausts of the contaminations and air can be achieved.

Since exhaust paths 20a, 20b and exhaust hole 20c are arranged at an upper side in the gravity direction than respective first and second poppet valve bodies 25, 26. Hence, bubbles mixed into the working oil within control valve 15 come to the surface and are quickly exhausted to reservoir tank 12 via exhaust paths 20a, 20b.

In addition, check valve 21 at exhaust hole 20c can prevent the contaminations and so forth exhausted within reservoir tank 12 from being again sucked toward exhaust passages 13, 14. Furthermore, an opening end of exhaust hole 20c is located at a position lower than an oil surface of the working oil within reservoir tank 12. Hence, there is no possibility that the air within corresponding reservoir tank 12 is sucked toward exhaust passages 13, 14.

Check valve 21 has the ball valve body biased in the closure direction by means of the spring force of coil spring 21a. When pressure within first and second exhaust passages 13, 14 becomes equal to or higher than the pressure within reservoir tank 12 by a predetermined value, check valve 21 is opened and the working oil can be exhausted into reservoir tank 12. In other words, the pressure within the piping can be held under a pressure state which is lower than the predetermined value. Hence, a response characteristic of the pressure application (pressurization) by means of pump 10 can be improved.

Control valve 15 is disposed in the midways through first and second passages 8, 9. Hence, during the driving of oil pump 10, the contamination and air within the piping can more effectively be exhausted into reservoir tank 12 via exhaust passages 13, 14 and the contaminations and air included in the working oil returned from respective oil hydraulic pressure chambers 6, 7 can be prevented from being caused to flow in oil pump 10.

By the introduction of oil pressure (hydraulic) of first and second passages 8, 9 into respective back pressure chambers 23a, 24a, respective first and second poppet valve bodies 25, 26 are biased in the closure direction by means of a synthesizing force of spring forces of respective first and second coil springs 28, 29 so that an effective interruption of one of the exhaust passages and the exhaust paths can be achieved.

In addition, as described above, free piston 27 of control valve 15 forcefully opens one of first and second poppet valve bodies 25, 26 by means of either center projections 27a, 27b via a corresponding one of first ans second exhaust passages 13, 14. A valve open responsive characteristic of corresponding one of poppet valve bodies 25, 26 can be improved.

Furthermore, axial oil holes (first and second pressure introducing holes) 25a, 26a penetrated in the axial direction of control valve 15 are installed in respective poppet valve bodies 25, 26. Hence, it is possible to directly introduce the hydraulic of first and second passages 8, 9 from respective oil holes (first and second pressure introducing holes) 25a, 26a to both sides of free piston 27. According to this, it is not necessary to install especially a communication passage or so forth.

First and second valve holes 22a, 22b are mutually arranged on the same axial line and are arranged in parallel to the line connecting both drain ports of oil pump 10. Thus, respective first and second exhaust passages 13, 14 can become shortest.

Fail-safe mechanism (fail-safe valve) 40 is disposed within the same pump body 1a as in the same case of control valve 15 and respective first and second passages 8, 9. It is not necessary to especially (additionally) install communication passage 41 to communicate between respective first and second passages 8, 9 and switching valve 43.

In addition, communication passage having a short length permits the working oil within respective hydraulic chambers 6, 7 to smoothly flow in the direction of switching valve 43 via respective first and second passages 8, 9. This permits the steering load during a failure of the apparatus to be reduced.

Figure 7:
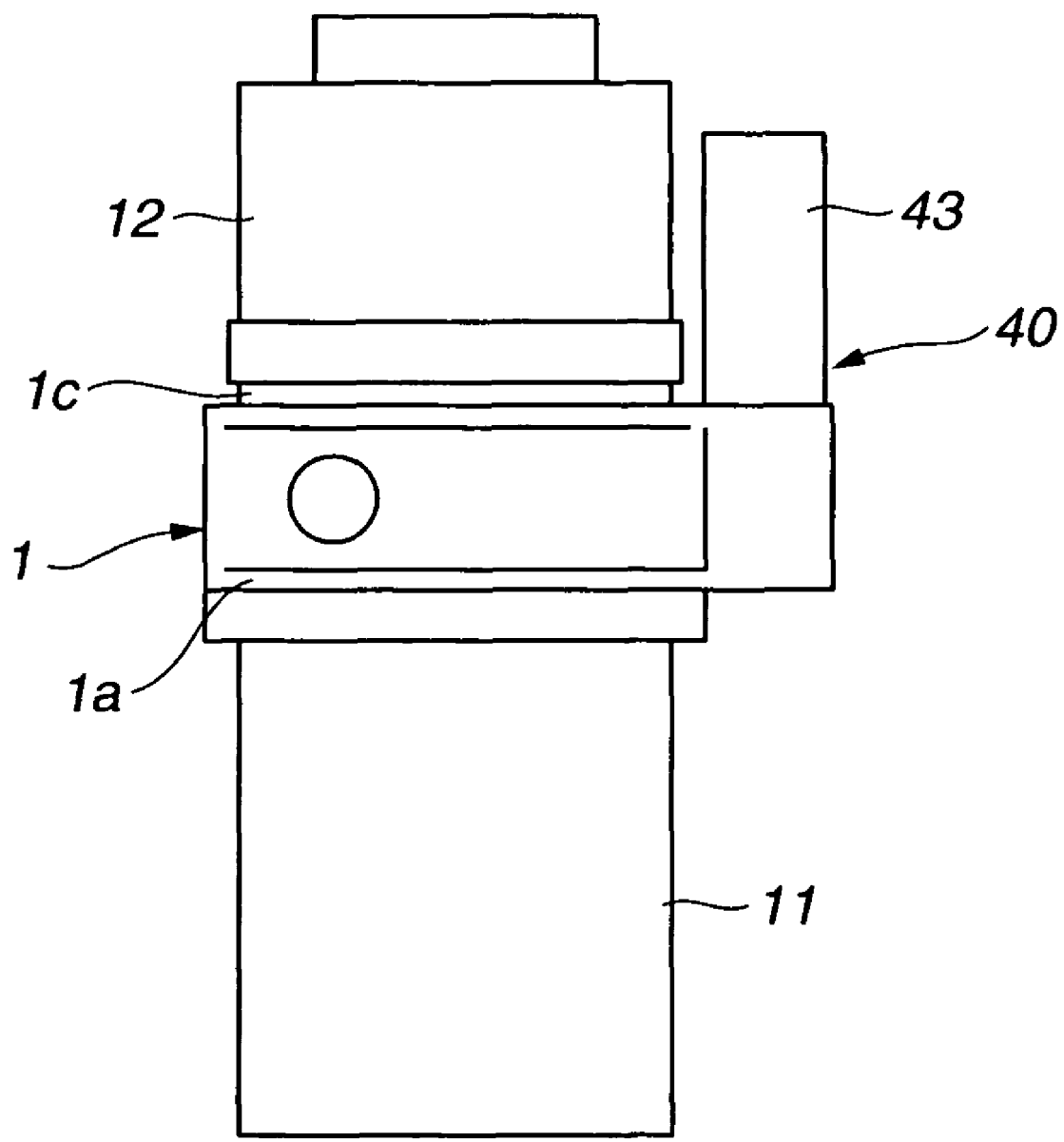
FIG. 7 is a rough side view of a pump device representing a second preferred embodiment according to the present invention.

FIG. 7 shows a second preferred embodiment of the pump device according to the present invention. In the second embodiment, part of switching valve 43 of fail-safe mechanism 40 is disposed in the upper direction with respect to a side surface of pump housing 1.

Thus, it is possible to reduce sufficiently a width in a radial direction of the pump device.

In addition, in the second embodiment, electric motor 11 and reservoir tank 12 are installed in the axial direction of the pump device. Hence, even if pump body 1a is disposed along the axial direction, an axial directional dimension of the whole apparatus does not become large.

The present invention is not limited to the structure in the first and second embodiments described above. For example, it is possible to apply the pump device to any other apparatuses than the power steering apparatus. It is noted that, as viewed from FIG. 1, reservoir tanks 12, 12, . . . , 12 are plural but reservoir tank 12 may actually be single denoted by 12.

Technical concepts of the present invention grasped from the first and second embodiments other than the invention described in each of appended claims 1 through 6 will herein be explained.

That is to say, item 1): A pump device applicable power steering apparatus, comprising: a hydraulic power cylinder configured to assist a steering force for a steering mechanism connected to steering road wheels and including a first hydraulic chamber and a second hydraulic chamber; a first passage connected to the first hydraulic chamber; a second passage connected to the second hydraulic chamber; a reversible pump in which a pump unit is installed within a pump housing and is configured to selectively supply a drain pressure to a pair of drain ports that communicate the first passage and the second passage according to normal and reverse revolutions of a driving shaft thereof, the reversible pump being configured to selectively supply a hydraulic pressure to the hydraulic power cylinder; a motor connected to the driving shaft of the reversible pump and configured to normally and reversely revolve the reversible pump; a steering load detecting section configured to detect or estimate a steering load of a steering wheel configured to perform a turning control for the steering road wheels; a motor control section configured to output a drive signal to the motor to develop a desired hydraulic on the basis of the steering load; a first bypass valve installed between the first passage and a reservoir tank, configured to interrupt a communication between the first passage and the reservoir tank when the first passage indicates a pressurization state, and configured to communicate the first passage with the reservoir tank when at least the second passage is in the pressurization state; and a second bypass valve installed between the second passage and the reservoir tank, configured to interrupt the communication between the second passage and the reservoir tank when the second passage is in the pressurization state, and configured to communicate the second passage with the reservoir tank when at least the first passage is in the pressurization state, the first bypass valve and the second bypass valve being disposed within the pump housing or a valve housing integrally installed with the pump housing.

According to the present invention described in item 1), the exhausted matter from the first or second bypass valve is limited to the contaminations and air within the piping in a range from the hydraulic power cylinder in a non-pressurization state to the corresponding one of the first and second bypass valves. In details, in the pressurization side, first and second bypass valves are in the interruption state. Hence, neither contaminations nor air is exhausted. A flow direction of the working oil present between the first and second bypass valves and the reversible pump is reversed. Hence, the working oil is not caused to be exhausted from the first and second bypass valves.

Then, according to the present invention described in item 1), the first and second bypass valves are disposed within the pump housing or within, for example, the valve housing installed in proximity of the pump housing. Thus, the distance between first and second bypass valves and the pair of drain ports of the pump housing can be shortened as minimum as possible (minimized). Consequently, the contaminations and air can speedily be exhausted.

Item 2): A pump device applicable power steering apparatus, comprising: a hydraulic power cylinder configured to assist a steering force for a steering mechanism connected to steering road wheels and including a first hydraulic chamber and a second hydraulic chamber; a first passage connected to the first hydraulic chamber; a second passage connected to the second hydraulic chamber; a pump unit configured to selectively supply a drain pressure to the first and second passages; a housing in an inside of which the pump unit is housed; an electric motor connected to the housing and configured to normally and reversely rotate the pump unit; a reservoir tank connected to the housing and configured to reserve the working oil therein; a first bypass valve installed in the housing, configured to interrupt the communication between the first passage and the reservoir tank during a pressurization state of the first passage, and configured to communicate the first passage and the reservoir tank when at least the second passage is in the pressurization state; a first exhaust path installed on the housing and configured to connect the first bypass valve and the reservoir tank; a second bypass valve disposed within the housing, configured to interrupt the communication between the second passage and the reservoir tank when the second passage is in the pressurization state, and configured to communicate the second passage and the reservoir tank when at least the first passage is in the pressurization state; and a second exhaust path disposed in the housing and configured to connect the second bypass valve to the reservoir tank.

According to the present invention as described in item 2), the same action and advantage as described in the case of item 1) can be obtained. That is to say, the first and second bypass valves are disposed within the housing in which the pump unit is installed and first and second exhaust passages which communicate between the first and second bypass valves and reservoir tank are formed within the housing. Thus, the distance between first and second bypass valves and the pair of drain ports of the pump housing can be shortened at minimum. Thus, it is possible to speedily exhaust the contaminations and air.

Item 3): The pump device applicable power steering apparatus as set forth in item 1), wherein an exhaust hole of the exhaust paths connecting the first bypass valve, the second bypass valve, and the reservoir tank is formed at an upper side in a gravity direction of the reservoir tank than the first bypass valve and the second bypass valve.

According to the invention defined in item 3), the air (bubbles) mixed within the working oil has (have) smaller specific gravity. Hence, the bubbles come to the surface of the reservoir tank from the exhaust passage so as to be positively exhausted.

Item 4): The pump device applicable power steering apparatus as set forth in item 1), wherein, in the exhaust paths connecting the first bypass valve, the second bypass valve, and the reservoir tank, a one-directional valve configured to allow only the flow of the working oil toward the reservoir tank from the first bypass valve and from the second bypass valve is disposed.

The contaminations and air once exhausted from the exhaust passages are prevented from being again sucked by means of the one-directional valve.

Item 5): The pump device applicable power steering apparatus as set forth in item claim 2), wherein a biasing section is installed and is configured to bias a one-directional valve disposed in an exhaust hole of the first and second exhaust paths to allow only a flow of a working oil from the first and second exhaust paths into the reservoir tank in its closure direction.

When the pressures within the exhaust passages are equal to or larger than a pressure within the reservoir tank (by a predetermined value) (the pressure is an atmospheric pressure), one-directional valve is opened so that the working oil is exhausted. That is to say, the pressure within the piping can be held under a pressure state which is lower than a predetermined value. Hence, without excessive reduction in the pressure of the piping, a response characteristic of the pressurization by means of the pump device can be improved.

Item 6): The pump device applicable power steering apparatus as set forth in item 1), wherein an exhaust hole opened within the reservoir tank of the exhaust passage is disposed at a position lower than an oil surface of the working oil reserved within the reservoir tank.

According to the present invention, the air within the reservoir tank can be prevented from being sucked from the exhaust port.

Item 7): The pump device applicable power steering apparatus as set forth in item 1), wherein the pump housing is configured to connect the pump housing and the power cylinder and includes a first connection portion and a second connection portion both of which are connection portions of first piping and second piping constituting parts of respective first and second passages, the first bypass valve is interposed between the pump unit and the first connection portion; and the second bypass valve is interposed between the pump unit and second connection portion.

In a range in which the flow is developed during the driving of the reversible pump, the bypass valves are arranged so that the contaminations and air can more positively be exhausted within the reservoir tank.

In addition, the flow in of the contaminations and air included in the working oil returned from the hydraulic power cylinder can be suppressed from being caused to flow into the reversible pump.

Item 8): The pump device applicable power steering apparatus as set forth in item 1), wherein the first bypass valve includes: a first valve housing hole disposed on the pump housing or the valve housing; a first valve body disposed within the fist valve housing hole to be axially movable; a first pressure introducing hole which is the first valve housing hole, is opened toward one end of the first valve body, and is communicated with the first passage; a first exhaust passage hole which is the first valve housing hole, is opened toward the other end of the first valve body, and is communicated with the reservoir tank; and a first valve seat interposed between the first valve body and the first exhaust passage hole and configured to interrupt the communication between the first valve body and the first exhaust passage hole when the first valve body is contacted therewith and the second bypass valve includes; a second valve housing hole installed in at least one of the pump housing and the valve housing; a second valve body axially movably disposed within the second valve housing hole; a second pressure introducing hole opened at the second valve housing hole toward one end of the second valve body and is communicated with the second passage; a second exhaust passage hole opened at the second valve housing hole toward the other end of the second valve body and which is communicated with the reservoir tank; and a second valve seat interposed between the second valve body and the second exhaust passage hole and configured to interrupt the communication between the second passage and the reservoir tank when the second valve body is contacted therewith.

According to the present invention described in item 8), a pressure rise within first and second passages causes one ends of first and second valve bodies to be biased and it becomes possible for the first and second bypass valves to be effectively in the interruption state.

Item 9): The pump device applicable power steering apparatus as set forth in item 8), wherein both of the first and second valve housing holes are aligned in the same straight line and the power steering apparatus further comprises: a valve communicating hole configured to communicate the first valve housing hole and the second valve housing hole; a piston member axially movably installed in the valve communicating hole and including a first pressure receiving surface that receives a pressure within the first passage at the first valve housing hole side and a second pressure receiving surface receiving a pressure within the second passage at the second valve housing hole side; and first and second projections installed on both ends in an axial direction of the piston member and configured to move the fist valve body in an open direction when the piston member is moved toward the first valve housing hole and to move the second valve body in the open direction when the piston member is moved toward the second valve body.

According to the invention described in item 9), when, for example, the first passage is in the pressurization state, this pressure within the first passage causes the piston member to be biased toward the second valve body side. This piston member opens forcibly the second valve body so that a valve open responsive characteristic can be improved.

Item 10): The pump device applicable power steering apparatus as set forth in item 9), wherein, while the first valve body is provided with a first pressure receiving chamber installed along the axial direction of the first valve body and which communicates between the first pressure introducing hole and the piston member, the second valve body is provided with a second pressure receiving chamber installed along the axial direction thereof which communicates the second pressure introducing hole and the piston member.

It is not especially necessary to install the communication passage additionally which communicates the first and second passages and the piston member. The pressure in first and second passages can be introduced onto the piston member.

Item 11): The pump device applicable power steering apparatus as set forth in item 9), wherein the first bypass valve is provided with a first biasing section to bias the first valve body toward the first valve seat and the second bypass valve is provided with a second biasing section to bias the second valve body toward the second valve seat.

Even if each of the first and second passages are in the non-pressurization state, each of the first and second bypass valves can be in the interruption state. Hence, even if the reversible pump is in the non-operation state, the pressure within the piping can be maintained.

Item 12): The pump device applicable power steering apparatus as set forth in item 8), wherein the first valve housing hole and the second valve housing hole are disposed approximately in the same straight line and are disposed approximately in parallel to the straight line connecting to the pair of drain ports of the pump unit.

Respective passages connecting between the first passage and the first bypass valve and connecting between the second passage and the second bypass valve can be shortened at minimum.

Item 13): The pump device applicable power steering apparatus as set forth in item 1), wherein the power steering apparatus further comprise a fail-safe valve configured to communicate between the first passage and the second passage when an abnormality in the apparatus occurs, the fail-safe valve being disposed within the housing in which the first bypass valve and the second bypass valve are mounted.

Since the first and second passages are formed within the housing in which the first and second bypass valves are disposed, it is not especially necessary to install additionally a pipe in a case where the fail-safe valve to communicate both of the first and second bypass valves is installed.

Item 14): The pump device applicable power steering apparatus as set forth in item 13), wherein the pump housing comprises: first connection portion and second connection portion which are connection portions between first piping and second piping constituting their respective parts of the first passage and the second passage; a first housing internal passage connecting the first connection portion and the pump unit and formed in the straight line form; and a second housing internal passage connecting the second connection portion and the pump unit and formed in the straight line form, the fail-safe valve being connected respectively to an end of the first housing internal passage and to an end of the second housing internal passage, respectively.

Since both of the first piping and the first housing internal passage connecting both the first piping and the fail-safe valve are formed in the straight line form and the fail-safe valve is connected to the end of the first housing internal passage, the flow of the working fluid between the first piping and the fail-safe valve can be smoothed. Thus, the steering load can be reduced during the failure (abnormality) of the apparatus.

Item 15): The pump device applicable power steering apparatus as set forth in item 1), wherein the power steering apparatus further comprises: a connection passage configured to connect the first passage and the second passage; and a switching valve installed in the connection passage and configured to switch the communication of and the interruption of the connection passage, the switching valve being installed within the pump housing.

Since the connection passage formed in the pump housing and configured to connect the first passage to the second passage is formed within the pump housing, it is not especially necessary to additionally dispose the piping connecting the connection passage and the switching valve.

In addition, since switching valve 43 is also installed within the pump housing, the piping to connect the connection passage to the switching valve is not needed.

This application is based on a prior Japanese Patent Application No. 2005-243644 filed in Japan on Aug. 25, 2005, the disclosures of which are hereby incorporated by reference. Various modifications and variations can be made without departing from the scope and the sprit of the present invention.

What is claimed is:
1. A pump device having a physical layout comprising:
a pump element housed within a pump housing and configured to pump a working oil;
an electric motor configured to drive the pump element;

a reservoir tank installed on the pump housing and configured to reserve the working oil supplied to the pump element;
a pair of main passages formed within the pump housing, with each main passage having an elongated cavity to channel a main flow of the working oil from the pump element to an oil-pressure-driven drive component; and
a control valve assembly spanning across the pair of main passages and provided in a control valve cavity within the pump housing, and configured to control a flow of the working oil caused to flow through the pair of main passages, wherein an intermediate position along the elongated cavity of each of the main passages, has a cross-section as taken perpendicularly to a longitudinal axis of the elongated cavity, which partially intersects a cross-section of the control valve cavity at a control valve cavity length embodying the control valve assembly therein in order for an intersecting cavity space to be commonly shared by the elongated cavity and the control valve cavity, and the intersecting cavity space serves as a communication channel for the working oil to travel between the elongated cavity and the control valve cavity, and wherein the pair of passages are connected on one side thereof to the pump element and on an other side thereof to the oil-pressure-driven drive component with the intersecting cavity space provided at the intermediate position.

2. The pump device as claimed in claim 1, wherein the control valve cavity is disposed approximately in parallel to a straight line connecting respective connection portions to connect between the pump element and the pair of main passages.

3. The pump device as claimed in claim 1, wherein the pump device further comprises: a connection passage configured to connect the pair of the main passages, and a switching valve configured to communicate with or interrupt the communication with the connection passage.

4. The pump device as claimed in claim 3, wherein part of the switching valve is housed within the pump housing, and the switching valve is disposed approximately in parallel to an axial direction of the pump element.

5. A pump device applicable power steering apparatus having a physical layout, comprising:
a pump device including:
  a pump element housed within a pump housing and configured to pump a working oil;
  an electric motor configured to drive the pump element;
  a reservoir tank installed on the pump housing and configured to reserve the working oil supplied to the pump element;
  a pair of main passages formed within the pump housing, with each main passage having an elongated cavity to channel a main flow of the working oil from the pump element to an oil-pressure-driven drive component; and
  a control valve assembly spanning across the pair of main passages and provided in a control valve cavity within the pump housing, and configured to control a flow of the working oil caused to flow through the pair of main passages, wherein an intermediate position along the elongated cavity of each of the main passages, has a cross-section as taken perpendicularly to a longitudinal axis of the elongated cavity, which partially intersects a cross-section of the control valve cavity at a control valve cavity length embodying the control valve assembly therein in order for an intersecting cavity space to be commonly shared by the elongated cavity and the control valve cavity, and the intersecting cavity space serves as a communication channel for the working oil to travel between the elongated cavity and the control valve cavity, and wherein the pair of passages are connected on one side thereof to the pump element and on an other side thereof to the oil-pressure-driven drive component with the intersecting cavity space provided at the intermediate position;
a hydraulic power cylinder as the oil-pressure-driven drive component, configured to assist a steering force for a steering mechanism connected to steering road wheels and including a first hydraulic chamber and a second hydraulic chamber, wherein a first main passage of one of the pair of main passages is connected to the first hydraulic chamber, and a second main passage of the other of the pair of main passages is connected to the second hydraulic chamber;
said pump device being a reversible pump device configured to selectively supply a drain pressure to a pair of drain ports that communicate with the first main passage and the second main passage according to normal and reverse revolutions of a driving shaft thereof, the reversible pump device being configured to selectively supply a hydraulic pressure to the hydraulic power cylinder;
wherein said electric motor is connected to the driving shaft of the reversible pump device and configured to normally and reversely revolve the reversible pump device;
a steering load detecting section configured to detect or estimate a steering load of a steering wheel configured to perform a turning control for the steering road wheels;
a motor control section configured to output a drive signal to the electric motor to develop a desired hydraulic on the basis of the steering load;
a first bypass valve installed between the first main passage and a reservoir tank, configured to interrupt a communication between the first main passage and the reservoir tank when the first main passage indicates a pressurization state, and configured to communicate the first main passage with the reservoir tank when at least the second main passage is in the pressurization state; and
a second bypass valve installed between the second main passage and the reservoir tank, configured to interrupt the communication between the second main passage and the reservoir tank when the second main passage is in the pressurization state, and configured to communicate the second main passage with the reservoir tank when at least the first main passage is in the pressurization state,
wherein the first bypass valve and the second bypass valve being disposed within the pump housing or a valve housing integrally installed within the pump housing.

6. The pump device applicable power steering apparatus as claimed in claim 5, wherein an exhaust hole of exhaust paths connecting the first bypass valve, the second bypass valve, and the reservoir tank is formed at an upper side in a gravity direction of the reservoir tank than the first bypass valve and the second bypass valve.

7. The pump device applicable power steering apparatus as claimed in claim 5, wherein, in exhaust paths connecting the first bypass valve, the second bypass valve, and the reservoir tank, a one-directional valve configured to allow only a flow of a working oil toward the reservoir tank from the first bypass valve and from the second bypass valve is disposed.

8. The pump device applicable power steering apparatus as claimed in claim 5, wherein an exhaust hole opened within the reservoir tank of the exhaust passage is disposed at a position lower than an oil surface of the working oil reserved within the reservoir tank.

9. The pump device applicable power steering apparatus as claimed in claim 5, wherein the pump housing is configured to connect the pump housing and the hydraulic power cylinder and includes a first connection portion and a second connection portion both of which are connection portions of first piping and second piping constituting parts of the respective first main passage and second main passage, the first bypass valve is interposed between the pump device and the first connection portion; and the second bypass valve is interposed between the pump device and second connection portion.

10. The pump device applicable power steering apparatus as claimed in claim 5:
wherein the first bypass valve includes: a first valve housing hole disposed on the pump housing or the valve housing; a first valve body disposed within the first valve housing hole to be axially movable; a first pressure introducing hole which is the first valve housing hole, is opened toward one end of the first valve body, and is communicated with the first main passage; a first exhaust passage hole which is the first valve housing hole, is opened toward the other end of the first valve body, and is communicated with the reservoir tank; and a first valve seat interposed between the first valve body and the first exhaust passage hole and configured to interrupt the communication between the first valve body and the first exhaust passage hole when the first valve body is contacted therewith; and
wherein the second bypass valve includes; a second valve housing hole installed in at least one of the pump housing and the valve housing; a second valve body axially movably disposed within the second valve housing hole; a second pressure introducing hole opened at the second valve housing hole toward one end of the second valve body and is communicated with the second main passage; a second exhaust passage hole opened at the second valve housing hole toward the other end of the second valve body and which is communicated with the reservoir tank; and a second valve seat interposed between the second valve body and the second exhaust passage hole and configured to interrupt the communication between the second main passage and the reservoir tank when the second valve body is contacted therewith.

11. The pump device applicable power steering apparatus as claimed in claim 10, wherein both of the first and second valve housing holes are aligned in the same straight line and the power steering apparatus further comprises: a valve communicating hole which communicates the first valve housing hole and the second valve housing hole; a piston member axially movably installed in the valve communicating hole and including a first pressure receiving surface receiving a pressure within the first main passage at the first valve housing hole side and a second pressure receiving surface receiving a pressure within the second main passage at the second valve housing hole side; and first and second projections installed on both ends in an axial direction of the piston member and configured to move the fist valve body in an open direction when the piston member is moved toward the first valve housing hole and to move the second valve body in the open direction when the piston member is moved toward the second valve body.

12. The pump device applicable power steering apparatus as claimed in claim 11, wherein, while the first valve body is provided with a first pressure receiving chamber installed along the axial direction of the first valve body and which communicates between the first pressure introducing hole and the piston member, the second valve body is provided with a second pressure receiving chamber installed along the axial direction thereof and which communicates the second pressure introducing hole and the piston member.

13. The pump device applicable power steering apparatus as claimed in claim 11, wherein the first bypass valve is provided with a first biasing section to bias the first valve body toward the first valve seat and the second bypass valve is provided with a second biasing section to bias the second valve body toward the second valve seat.

14. The pump device applicable power steering apparatus as claimed in claim 10, wherein the first valve housing hole and the second valve housing hole are disposed approximately in the same straight line and are disposed approximately in parallel to the straight line connecting to the pair of drain ports of the pump device.

15. The pump device applicable power steering apparatus as claimed in claim 5, wherein the power steering apparatus further comprises a fail-safe valve configured to communicate between the first main passage and the second main passage when an abnormality in the apparatus occurs, the fail-safe valve being disposed within the housing in which the first bypass valve and the second bypass valve are mounted.

16. The pump device applicable power steering apparatus as claimed in claim 15, wherein the pump housing comprises: first connection portion and second connection portion which are connection portions between first piping and second piping constituting their respective parts of the first main passage and the second main passage; a first housing internal passage connecting the first connection portion and the pump device and formed in the straight line form; and a second housing internal passage connecting the second connection portion and the pump device and formed in the straight line form, the fail-safe valve being connected respectively to an end of the first housing internal passage and to an end of the second housing internal passage, respectively.

17. The pump device applicable power steering apparatus as claimed in claim 5, wherein the power steering apparatus further comprises: a connection passage configured to connect the first main passage and the second main passage; and a switching valve installed in the connection passage and configured to switch the communication of, and the interruption of, the connection passage, the switching valve being installed within the pump housing.

18. A pump device applicable power steering apparatus having a physical layout, comprising:
a pump device including:
a pump element housed within a pump housing and configured to pump a working oil;
an electric motor configured to drive the pump element;
a reservoir tank installed on the pump housing and configured to reserve the working oil supplied to the pump element;
a pair of main passages formed within the pump housing, with each main passage having an elongated cavity to channel a main flow of the working oil from the pump element to an oil-pressure-driven drive component; and
a control valve assembly spanning across the pair of main passages and provided in a control valve cavity within the pump housing, and configured to control a flow of the working oil caused to flow through the pair of main passages, wherein the pair of main passages are formed on the same plane, and wherein an intermediate position along the elongated cavity of each of the main passages, has a cross-section as taken perpendicularly to a longitudinal axis of the elongated cavity, which partially intersects a cross-section of the control valve cavity at a control valve cavity length embodying the control valve assembly therein in order for an intersecting cavity space to be commonly shared by the elongated cavity and the control valve cavity, and the intersecting cavity space serves as a communication channel for the working oil to travel between the elongated cavity and the control valve cavity, and wherein the pair of passages are connected on one side thereof to the pump element and on an other side thereof to the oil-pressure-driven drive component with the intersecting cavity space provided at the intermediate position;

a hydraulic power cylinder as the oil-pressure-driven drive component, configured to assist a steering force for a steering mechanism connected to steering road wheels and including a first hydraulic chamber and a second hydraulic chamber, wherein a first main passage of one of the pair of main passages is connected to the first hydraulic chamber; a second main passage of the other of the pair of main passages is connected to the second hydraulic chamber;

wherein the pump device is configured to selectively supply a drain pressure to the first and second main passages;

a first bypass valve installed in the pump housing, configured to interrupt the communication between the first main passage and the reservoir tank during a pressurization state of the first main passage, and configured to communicate the first main passage and the reservoir tank when at least the second main passage is in the pressurization state;

a first exhaust path installed on the pump housing and configured to connect the first bypass valve and the reservoir tank;

a second bypass valve disposed within the pump housing, configured to interrupt the communication between the second main passage and the reservoir tank when the second main passage is in the pressurization state, and configured to communicate the second main passage and the reservoir tank when at least the first main passage is in the pressurization state; and a second exhaust path disposed in the pump housing and configured to connect the second bypass valve to the reservoir tank.

19. The pump device applicable power steering apparatus as claimed in claim 18, wherein a biasing section is installed and is configured to bias a one-directional valve disposed in an exhaust hole of the first and second exhaust paths, to allow only a flow of a working oil from the first and second exhaust paths into the reservoir tank in its closure direction.

20. The pump device as claimed in claim 1, wherein the pump device further comprises: a connection passage configured to connect the pair of the main passages; a switching valve configured to communicate with or interrupt the communication with the connection passage; and a pair of openings formed on an outer surface of the pump housing, the pair of openings supplying hydraulic pressure to the pump element and exhausting hydraulic pressure to outside of the pump housing, wherein the connection passage is connected to the pair of main passages at a pair of the other ends of the pair of main passages, and the switching valve is positioned at an opposite side of the pair of openings.

21. A pump device having a physical layout comprising:
a pump element housed within a pump housing and configured to pump a working oil;
an electric motor configured to drive the pump element;
a reservoir tank installed on the pump housing and configured to reserve the working oil supplied to the pump element;
a pair of main passages formed within the pump housing, with each main passage having an elongated cavity to channel a main flow of the working oil from the pump element to an oil-pressure-driven drive component; and
a control valve assembly provided in a control valve cavity within the pump housing, and configured to control a flow of the working oil caused to flow through the pair of main passages, wherein an intermediate position along the elongated cavity of each of the main passages, has a cross-section as taken perpendicularly to a longitudinal axis of the elongated cavity, which partially intersects a cross-section of the control valve cavity at a control valve cavity length embodying the control valve assembly therein in order for an intersecting cavity space to be commonly shared by the elongated cavity and the control valve cavity, and the intersecting cavity space serves as a communication channel for the working oil to travel between the elongated cavity and the control valve, and wherein the pair of passages are connected on one side thereof to the pump element and on an other side thereof to the oil-pressure-driven drive component with the intersecting cavity space provided at the intermediate position.

* * * * *